United States Patent [19]
Seago

[11] Patent Number: 5,990,900
[45] Date of Patent: Nov. 23, 1999

[54] TWO-DIMENSIONAL TO THREE-DIMENSIONAL IMAGE CONVERTING SYSTEM

[75] Inventor: Sean W. Seago, Seattle, Wash.

[73] Assignee: Be There Now, Inc., Seattle, Wash.

[21] Appl. No.: 08/998,130

[22] Filed: Dec. 24, 1997

[51] Int. Cl.[6] .................................................. G06T 15/00
[52] U.S. Cl. ........................................ 345/427; 345/419
[58] Field of Search .................................. 345/418, 419, 345/425, 426, 427, 428

[56] References Cited

U.S. PATENT DOCUMENTS

| | | |
|---|---|---|
| 4,674,046 | 6/1987 | Ozeki et al. . |
| 4,841,292 | 6/1989 | Zeno . |
| 4,845,643 | 7/1989 | Clapp . |
| 5,079,703 | 1/1992 | Mosher et al. . |
| 5,124,693 | 6/1992 | Himelstein et al. . |
| 5,422,987 | 6/1995 | Yamada . |
| 5,533,177 | 7/1996 | Wirtz . |

OTHER PUBLICATIONS

Debevec, P.E., et al., "Modeling and Rendering Architecture from Photographs: A hybrid geometry—and image–based approach," University of California at Berkeley, pp. 1–5, 10.

*Primary Examiner*—Phu K. Nguyen
*Assistant Examiner*—Cliff N. Vo
*Attorney, Agent, or Firm*—Christensen O'Connor Johnson & Kindness PLLC

[57] ABSTRACT

A method, system and computer-readable medium for converting objects in two-dimensional images into three-dimensional objects. Vanishing points for an object selected from a digitized two-dimensional perspective image are determined. Then, a three-dimensional coordinate space for the selected object is derived based on the determined vanishing points. The system then generates a three-dimensional object in the generated three-dimensional coordinate space based on user-designated vertices at significant features of the selected object in the two-dimensional perspective image. The three-dimensional coordinate space and three-dimensional object are generated using non-linear optimization algorithms. The system extracts surface texture information from the two-dimensional images and maps the extracted texture information onto the generated three-dimensional object. The system also converts multiple three-dimensional objects created from two-dimensional images of a single object into a single three-dimensional object. A set of conjugate vertices, vanishing lines and/or planes sufficient for the determination of the relative orientations of two or more precreated three-dimensional objects are identified between precreated two or more three-dimensional objects. Then, the precreated two or more three-dimensional objects are merged into a single three-dimensional object based on the identified set of conjugate vertices, vanishing lines or planes and a non-linear optimization algorithm.

40 Claims, 12 Drawing Sheets

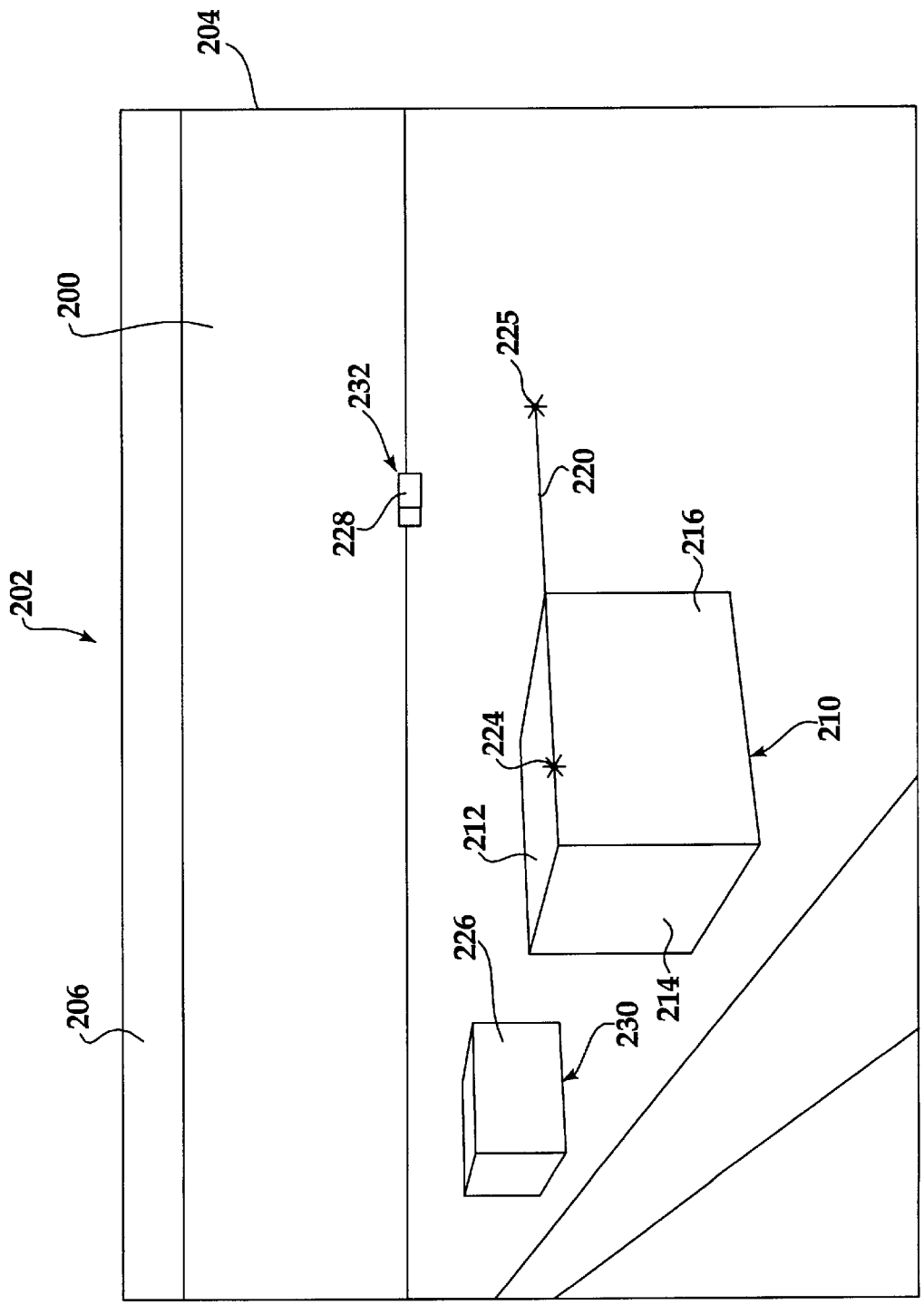

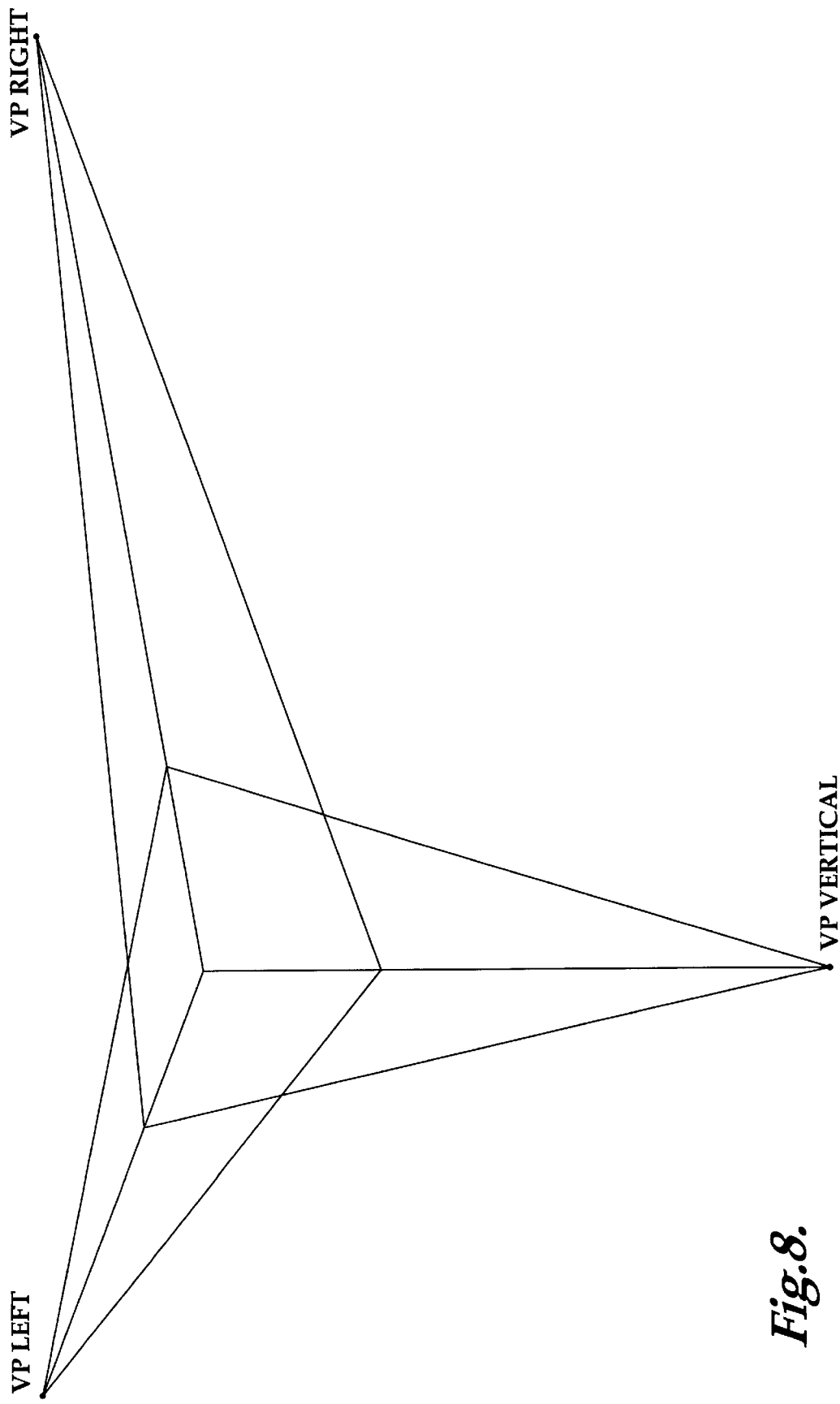

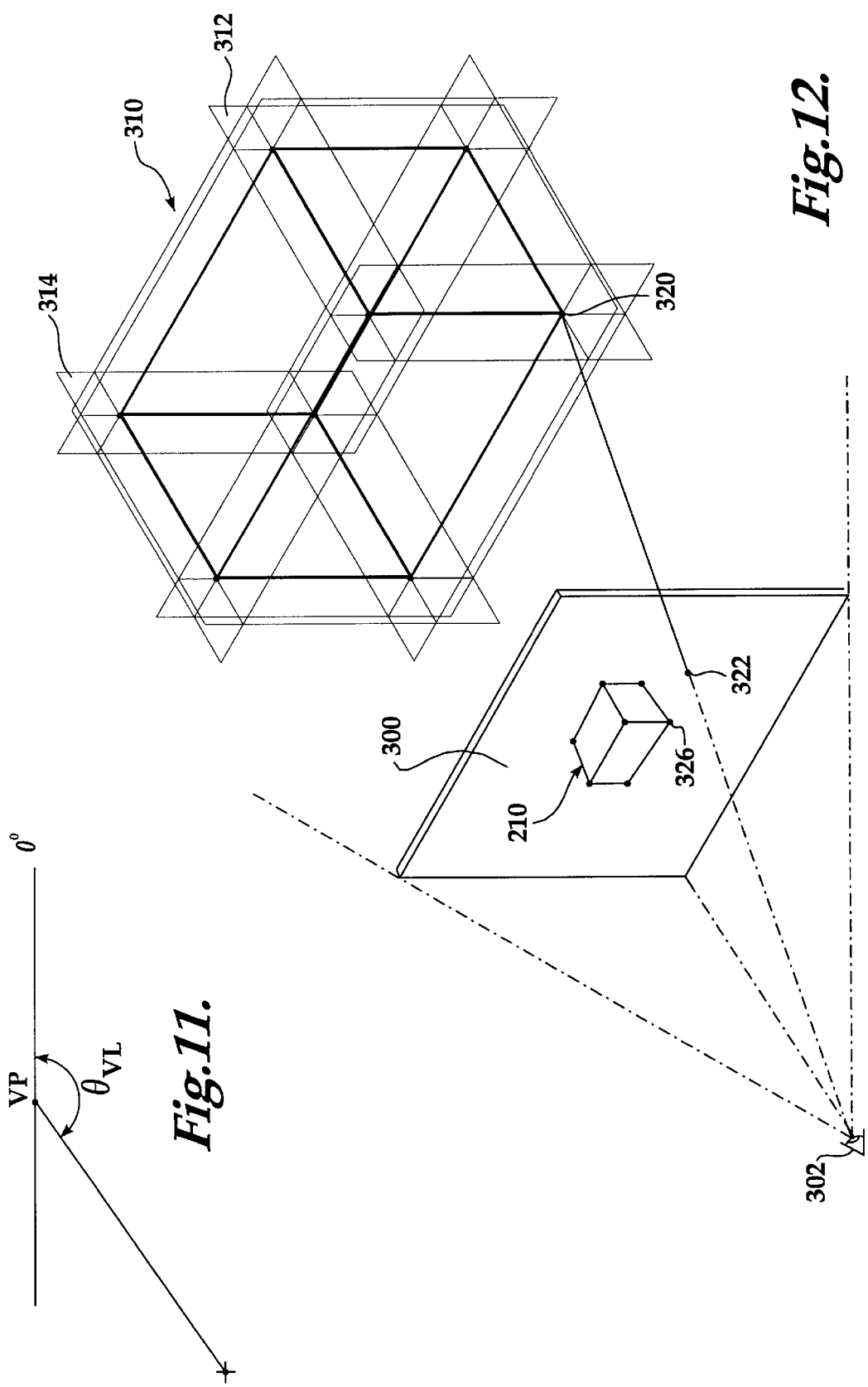

5,990,900

TWO-DIMENSIONAL TO THREE-DIMENSIONAL IMAGE CONVERTING SYSTEM

FIELD OF THE INVENTION

This invention relates to methods, apparatus and computer-readable medium for efficiently generating accurate three-dimensional digital computer models or objects.

BACKGROUND OF THE INVENTION

As will be better understood from the following description, the present invention was developed to efficiently and accurately generate three-dimensional digital computer objects from one or more two-dimensional images of the object. Three-dimensional objects are shapes defined in a three-dimensional coordinate space. Three-dimensional objects are rendered onto a display device using a three-dimensional object graphics application that allows a user to change the rendered viewpoint of the three-dimensional object.

Efforts to model the appearance and dynamics of the real world have produced some of the most compelling imagery in computer graphics. In particular, efforts to model architectural scenes have produced impressive walk-throughs and inspiring fly-bys. Exploring an architectural structure without having to spend the time and money to physically travel to the structure is very attractive in many fields, such as corporate real estate sales.

Unfortunately, current geometry-based methods of modeling existing architecture or objects, in which a modeling program is used to manually position the elements of the scene, have several drawbacks. First, the process is extremely labor-intensive, typically involving surveying the site, locating and digitizing architectural plans, or converting existing CAD data. Second, it is difficult to verify whether the resulting model is accurate, and the resulting model noticeably appears computer-generated. Even the processes that employ liberal texture mapping generally fail to resemble real photographs.

Recently, creating digital computer models directly from photographs has received increased interest in computer graphics. Since real images are used as input, such an image-based system has an advantage in producing photo-realistic renderings as output. Some of the most promising of these systems rely on the computer vision technique of computational stereopsis to automatically determine the structure of the scene from multiple photographs. As a consequence, however, these systems are only as strong as the underlying algorithms, which have a number of significant weaknesses. In particular, the photographs need to appear very similar for reliable results to be obtained. Because of this, current image-based techniques must use many closely spaced images and, in some cases, employ significant amounts of user input. In this framework, capturing the data for a realistically renderable model requires a number of closely spaced photographs, and deriving the depth from the photographs requires an amount of user input that is inefficient for large-scale model generation. These concessions to the weakness of stereo algorithms bode poorly for creating large-scale, freely navigable virtual environments from photographs in a cost effective manner.

The present invention is directed to overcoming the foregoing and other disadvantages. More specifically, the present invention is directed to providing a method, apparatus and computer-readable medium for generating highly accurate three-dimensional digital computer models or objects from one or more two-dimensional images.

SUMMARY OF THE INVENTION

In accordance with this invention, a method, system and computer-readable medium for converting digitized two-dimensional images of objects into three-dimensional digital computer objects is provided. An object displayed within a two-dimensional perspective image is selected for conversion into a three-dimensional object. The two-dimensional perspective image is generated from a digital video camera, a still camera, a graphics program or CAD program. Then, the selected object's approximate orientation, or natural coordinate system, is determined. Next, lines are created that overlap parallel lines on the selected object or other objects within the digital image that appear to have the same natural coordinate system as that of the selected object. Following line designation, the vanishing points of the natural coordinate system are calculated based on the designated lines. The orientation of a three-dimensional coordinate space and focal length of the image for the selected object is derived based on the calculated vanishing points. The user then designates vertices or vanishing lines at significant features of the selected object using a graphical interface displayed on the display device and operable with the input device. Plane indexes are generated for each designated vertex or vanishing line based on the determined perspective vanishing points and a three-dimensional digital computer object is generated using the plane indexes.

In accordance with other aspects of this invention, the three-dimensional coordinate space is generated by setting a three-dimensional coordinate space to a default orientation relative to the image plane, extending line segments to an approximate infinite position along each of the coordinate space's axis, projecting the endpoints of the axis through the image plane to a viewpoint centered over the image and located at a default focal length from the image plane, comparing the image plane location of each calculated vanishing point to the corresponding projected line segment endpoint, and determining an error function based on the comparisons. If the error function is not at an acceptable level, the orientation of the three-dimensional coordinate space and the focal length of the viewpoint are adjusted based on the determined error function and the foregoing steps are repeated. The three-dimensional coordinate space and derived focal length of the image is saved, when the error function is at an acceptable level.

In accordance with still other aspects of this invention, the three-dimensional digital computer object is generated by setting planes at a default position, determining the set planes' intersection points that correspond to designated vertices in the generated three-dimensional coordinate space, projecting those determined intersection points to the image plane along a line of sight to the viewpoint, which is behind the image plane a distance equal to the focal length, comparing the image plane location of each vertex to the corresponding projected intersection point, and determining an error function based on all the comparisons. If the error function is not at an acceptable level, the set planes' positions are adjusted based on the determined error function. The adjustment is performed by moving each plane along the three-dimensional coordinate space axis that is parallel to the plane's normal vector, thereby changing the position of the intersecting points of the planes. Then, the steps above are repeating. When the error function is at an acceptable level, the three-dimensional digital computer object that is defined by the vertices which are positioned at intersections of the planes is saved.

In accordance with still yet other aspects of this invention, the system extracts surface texture information from the two-dimensional image by determining the desired resolution level of the texture for the three-dimensional digital computer object, incrementing vanishing lines in an angular manner from the vanishing points based on the determined desired resolution level, sampling image information from the two-dimensional images based on the intersections of the angularly incremented vanishing lines, and mapping the sampled image information onto the corresponding surface texture location on the generated three-dimensional digital computer object based on the surface texture information location within the corresponding determined shape.

In accordance with further aspects of this invention, the system also converts multiple three-dimensional digital computer objects created from two-dimensional images of a single object into a single three-dimensional digital computer object. Significant conjugate features are identified between precreated two or more three-dimensional digital computer objects. Then, the precreated two or more three-dimensional digital computer objects are merged into a single three-dimensional digital computer object based on the identified significant conjugate features.

As will be readily appreciated from the foregoing summary, the invention provides a new and improved method, system and computer-readable medium for efficiently and accurately converting two-dimensional images of objects into three-dimensional digital computer objects. Because the system does not rely on a strict analytical mathematical interpretation for determining the generated three-dimensional digital computer object, accuracy and efficiency in generating three-dimensional objects is improved.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 7 is a screen shot of a window that includes a two-dimensional digitized image with multiple objects;

FIG. 8 is a diagram illustrating perspective vanishing points for an object displayed in the image of FIG. 7;

FIG. 11 is a diagram illustrating vanishing line value determination;

FIG. 12 is an illustration of the process of generating a three-dimensional object based on the designated shapes performed using the graphical interface tools of FIGS. 9 or 10.

DETAILED DESCRIPTION OF THE PREFERRED EMBODIMENT

Figure 1:
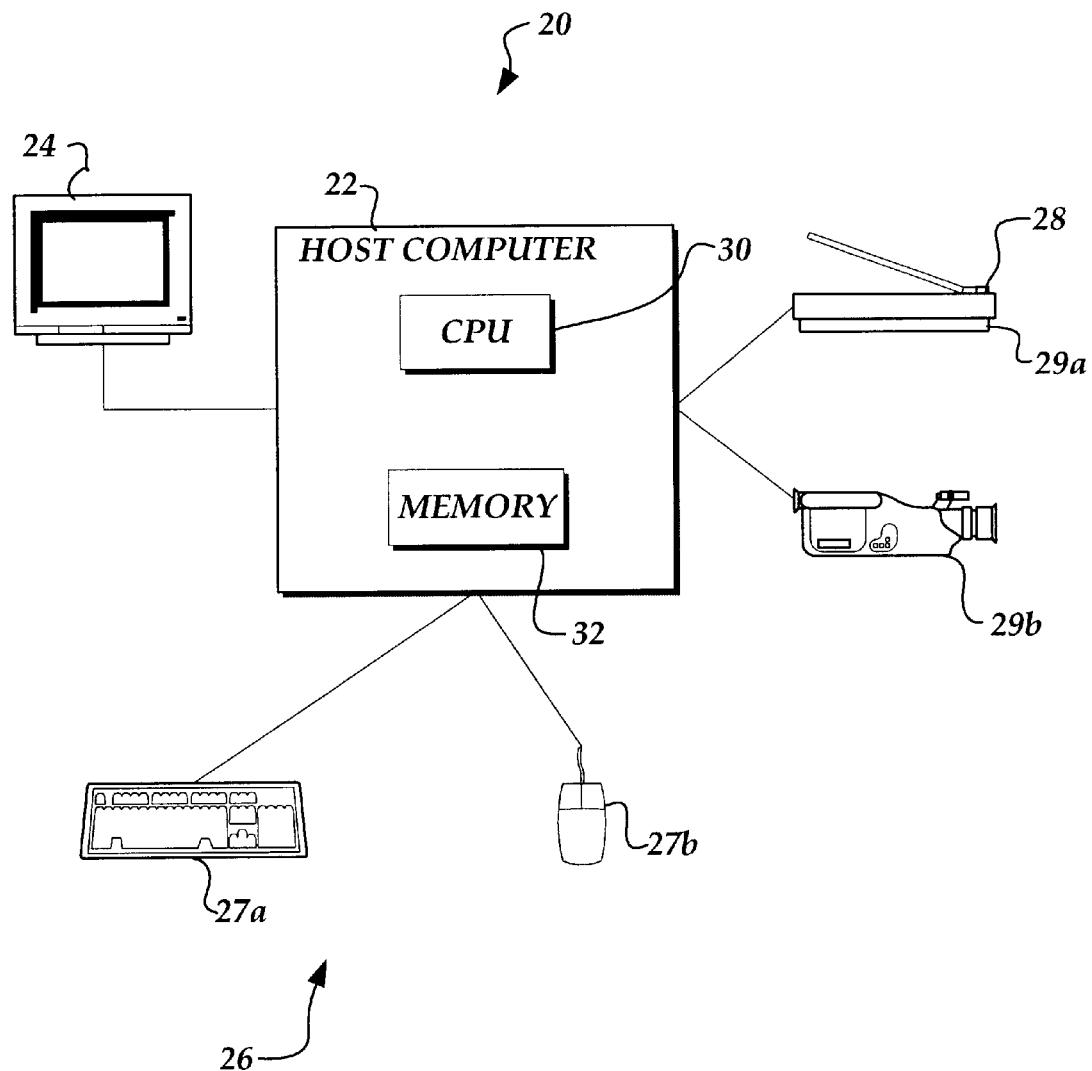
FIG. 1 is a diagram illustrating some of the basic components of a computer system suitable for embodying the present invention.

FIG. 1 illustrates an image converting system 20 formed in accordance with the present invention. More specifically, FIG. 1 includes a host computer 22 that is coupled to a display device 24, interface devices 26 and digital image input devices 28. The host computer 22 includes a central processing unit (CPU) 30, memory 32 and any device drivers (not shown) required to interact with the coupled devices. Host computer 22 may be a typical desktop PC whose CPU 30 can execute a windows-based operating system. The user interface devices 26 may be a keyboard 27a, mouse 27b or any other type of user interface device that can be used in graphics or computer aided design (CAD). The digital input devices 28 may be a scanner 29a, a video camera 29b, a still image camera (not shown), or any other device that can produce a perspectively-accurate two-dimensional digital image. Digital images may also be generated by a graphics or CAD software program or a perspectively accurate hand-drawn picture that a user interacts with using the user interface devices 26.

Figure 2:
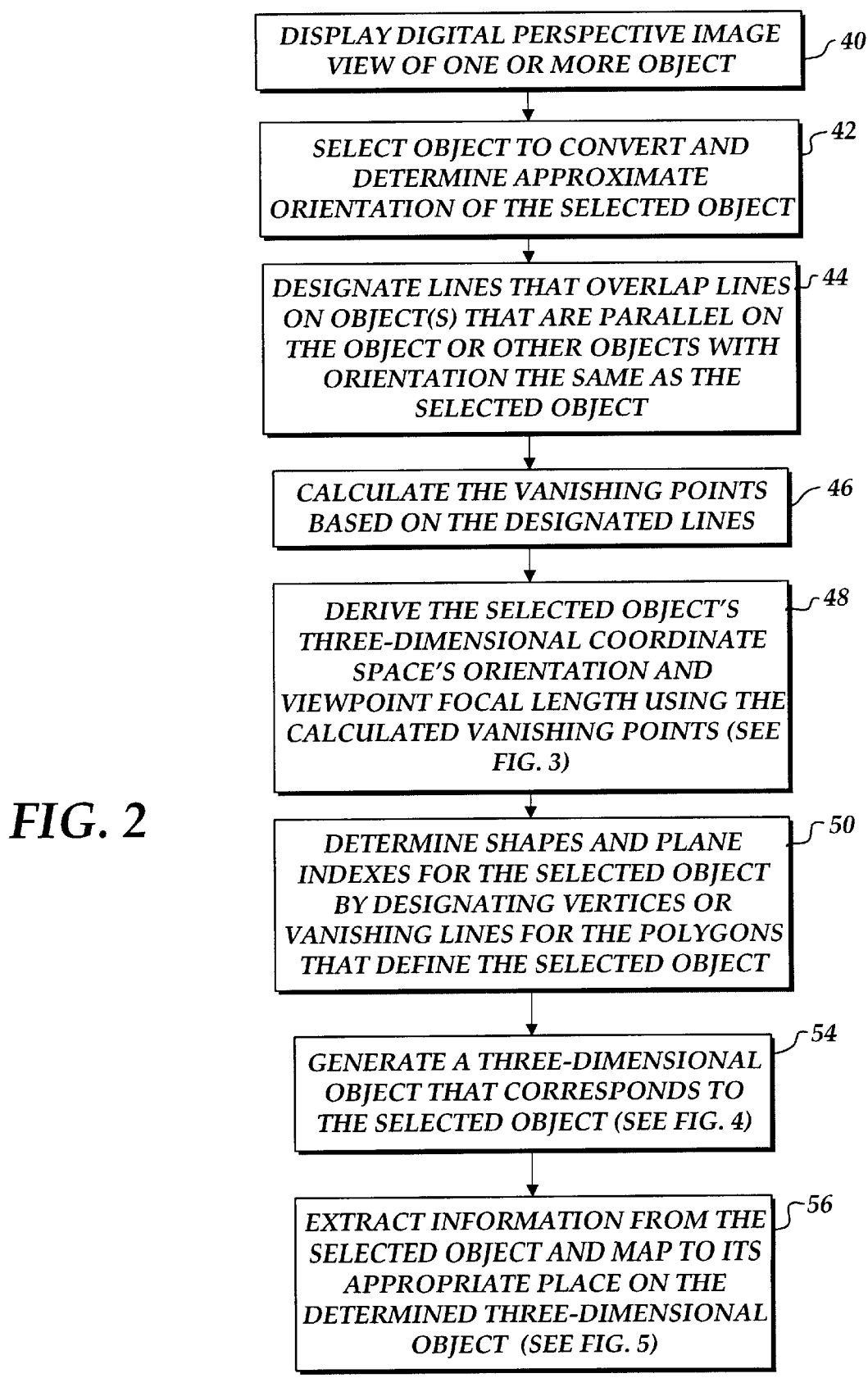
FIGS. 2–5 are flow diagrams illustrating the steps for converting single two-dimensional images of objects into three-dimensional objects.

FIG. 2 illustrates the process by which the image converting system 20 generates a three-dimensional model or object from a single two-dimensional image. The generated three-dimensional object is generated and stored for later use by a three-dimensional graphics display application. A user retrieves and renders on a display device the generated three-dimensional object using a three-dimensional graphics application that corresponds to the generated three-dimensional object. The three-dimensional graphics application allows the user to change the viewpoint of the three-dimensional object.

First, at block 40, a digitized two-dimensional perspective image of one or more objects is retrieved from memory 32 or a digital image input device 28 and displayed on the display device 24. The digitized two-dimensional perspective image of the one or more objects is a digital image generated by a digital video camera 29b, a still camera (not shown), a hand drawing (not shown), a graphics program (not shown) or CAD program (not shown), or is generated by digitizing an image through an image digitizing scanner 29a, or by some other program or device that generates a digital image. The two-dimensional image is displayed on a two dimensional image plane (also referred to as projection or view plane). Next, at block 42, an object contained within the digital image is selected for conversion into a three-dimensional object, and the selected object's orientation, or natural coordinate system, is approximately determined. These are visual steps performed by a user. Selection of an object merely involves selecting which object within the displayed image the user wishes to convert into a three-dimensional object. The approximate orientation determination involves visualizing the selected object and determining the location of the selected object's three orthogonal sides or in other words the object's natural coordinate system. Using the perspective image, the user approximates the location of the vanishing points of the selected object within the image plane. The first step in the determination of vanishing point locations is at block 44, where lines are created that overlap parallel lines on the selected object or other objects within the digital image that appear to have the same orientation (i.e., have the same vanishing points and natural coordinate system) as that of the selected object based on the approximate orientation determination. Line creation can be performed automatically by image analysis software, which determines edges of objects and creates lines overlapping the determined edges. More preferably, the user uses line generating software to designate these lines. The lines overlapped on the selected object are lines that lie parallel to one another on the actual object represented by the image of the selected object. On the displayed two-dimensional perspective image, the overlapped lines do not appear to be parallel, but appear to converge at varying angles to the vanishing points. The minimum number of lines required for each of the three vanishing points for this designation step is two. Line designation is illustrated in FIG. 7 and described in more detail below.

Following line designation, the system calculates the vanishing points of the selected object's natural coordinate system based on the designated lines. See block 46. Vanishing point calculation is performed independently for each of the selected object's vanishing points. If only two lines are designated for a given vanishing point, a simple line intersection algorithm is performed to determine the vanishing point. If more than two lines are designated for use in determining a vanishing point, a clustering algorithm is used to determine the optimal position for the vanishing point. The results of these determinations are two-dimensional values in the image plane.

Figure 3:
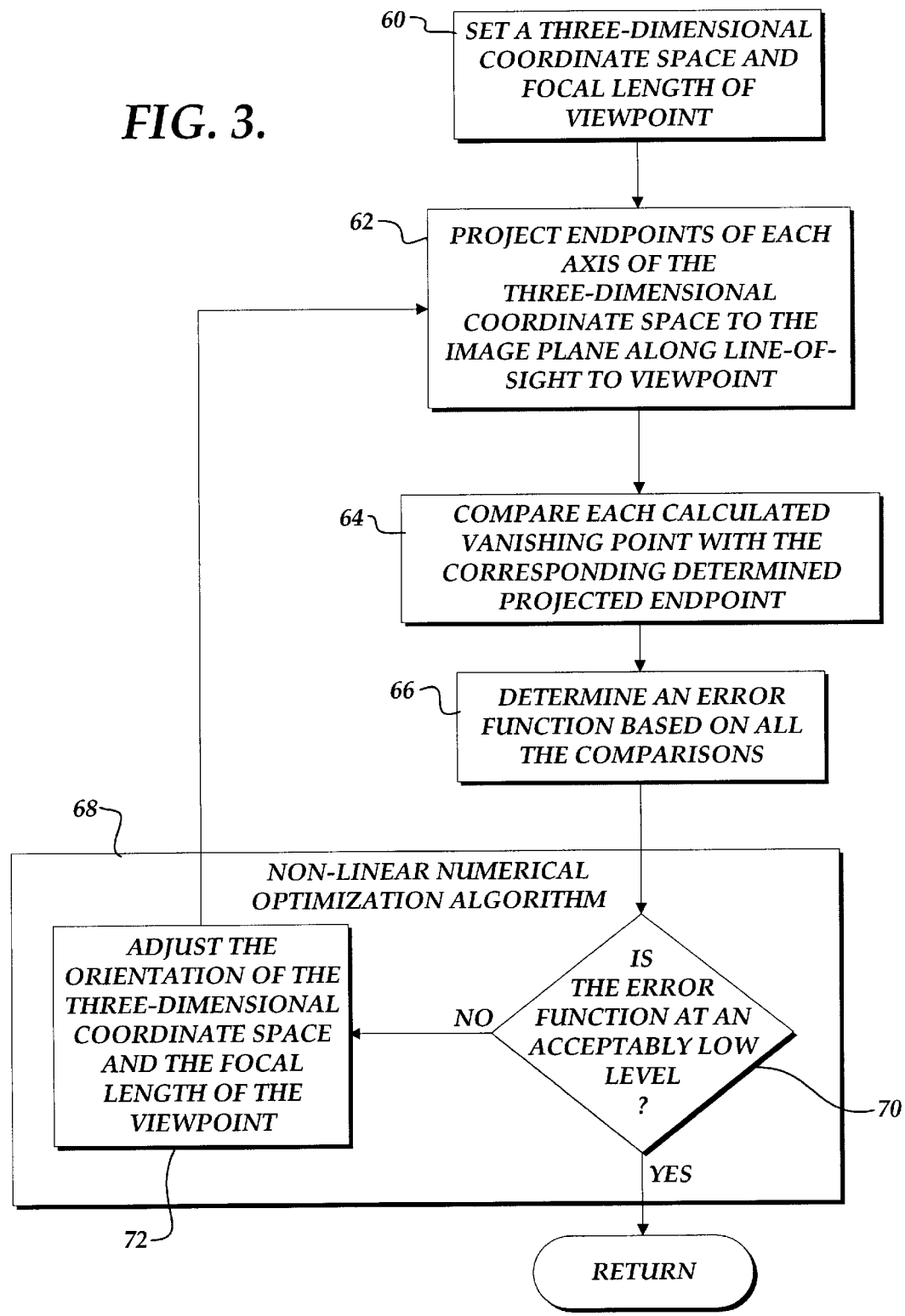

After the vanishing points have been calculated, the orientation of a three-dimensional coordinate space for the selected object is derived based on the calculated vanishing points. See block 48. The orientation relative to the image plane of the three-dimensional coordinate space for the selected object as well as the focal length of the image's viewpoint are determined by an iterative process that includes a non-linear optimization algorithm that is illustrated in FIG. 3 and described in more detail below. The three-dimensional coordinate space is the screen world coordinate space (SWCS) with the origin located at the center of the perspective image. Next, at blocks 50, shapes or polygons that define the selected object's sides, and plane indexes are determined based on user designated vertices or vanishing lines at significant features of the selected object. The determined plane indexes are not actual values for planes in the derived three-dimensional coordinate space (SWCS), but are place holders for actual plane values that will be determined. Essentially, the plane indexes indicate the relationships between designated vertices and vanishing lines, thereby reducing redundancy when the three-dimensional object is generated. The designation of vertices and vanishing lines and the determination of polygons of a selected object are illustrated by example in the graphical user interfaces shown in FIGS. 9 and 10 and described in more detail below.

Figure 4:
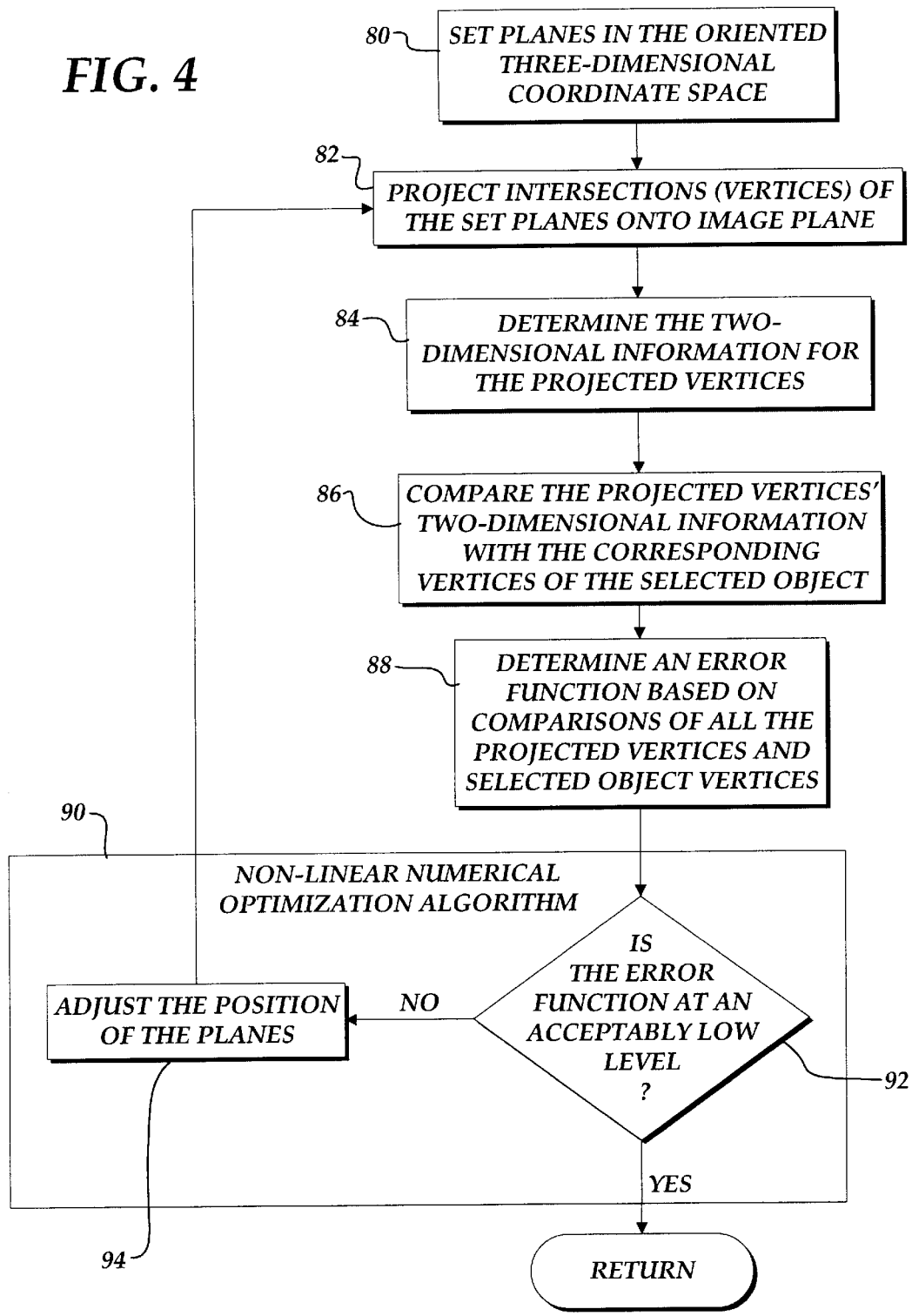

Once all the polygons and plane indexes of a selected object have been determined, a three-dimensional object oriented within the selected object's three-dimensional coordinate space is determined. See block 54. The three-dimensional object is generated by an iterative process that includes a non-linear optimization algorithm that is illustrated in FIG. 4 and described in more detail below. Finally, the displayed digital image is scanned to determine the surface texture information for the sides of the three-dimensional object based on the perspective points. The determined texture values are then mapped onto the polygons of the defined three-dimensional object. See block 56. Essentially, the step in block 56 extracts the selected object's digital image information and maps it to its respective position on the three-dimensional object. This step is illustrated in FIG. 5 and described in more detail below.

FIG. 3 illustrates the process for deriving the selected object's coordinate space (SWCS) from block 48 of FIG. 2. First, at block 60, the three-dimensional coordinate space's orientation relative to the image plane and a default position (focal length) for the perspective image's viewpoint are set. The viewpoint is along a normal to the image plane at the image's center. The three-dimensional coordinate space (SWCS) is set at the center of the perspective image. Next, at block 62, the intersection points between the image plane and the line-of-sight from the viewpoint to the endpoints of line segments extended to an approximate infinite point along each axis of the three-dimensional coordinate space (SWCS) are determined. In other words, the end of each axis is projected back to the image plane. At block 64, each calculated vanishing point is compared to the corresponding determined projected axis endpoint. The three-dimensional coordinate space (SWCS) includes a left, right and vertical axis that correspond to the left, right and vertical vanishing points, respectively. Then, at block 66, an error function is determined based on the comparisons from block 64. Next, at block 68, an iterative non-linear numerical optimization algorithm executes according to the determined error function. More specifically, at decision block 70, the non-linear optimization algorithm determines if the determined error function is at an acceptably low level. If the error function is acceptable, an adequate three-dimensional coordinate space orientation and image viewpoint focal length have been found and the process returns to FIG. 2. However, if the non-linear optimization algorithm determines that the error function is not at an acceptably low level, the three-dimensional coordinate space orientation and viewpoint focal length are adjusted based on the determined error function. See block 72. After three-dimensional coordinate space adjustment, the image converting system repeats the steps performed in blocks 62–68 until an acceptable error function is found by decision block 70.

FIG. 4 illustrates the three-dimensional object generation process shown in block 54 of FIG. 2. First, at block 80, planes are set at a default position within the oriented selected object's three-dimensional coordinate space (SWCS). The number of set planes corresponds to the number of distinct plane indexes determined at block 50 of FIG. 2. The corresponding relationship between the set planes in SWCS and the plane indexes provides the necessary relationship connection between three-dimensional space and the designated vertices defined in two-dimensional space. Next, at block 82, those intersection points of the set planes that correspond to designated vertices are projected back to the image plane using the viewpoint with focal length determined in block 48 of FIG. 2. At block 84, the projected vertices' two-dimensional values on the image plane are determined. Then, at block 86, the image plane location of each designated vertex of the selected object is compared to its corresponding determined projected vertex. At block 88, an error function is determined based on the comparisons made at block 86. Next, at block 90, an iterative non-linear numerical optimization algorithm is executed according to the determined error function. More specifically, at decision block 92, the non-linear optimization algorithm determines if the determined error function is at an acceptably low level. An acceptable error function level exists when the difference between the projected vertices and the selected object's vertices is below some minimal value. If the determined error function is at an acceptably low level, the process continues as shown in FIG. 2. However, if the non-linear optimization algorithm determines that the determined error function is not at an acceptably low level, the planes' positions are adjusted based on the determined error function. See block 94. The planes are adjusted by moving each plane along the three-dimensional coordinate space axis that is parallel to the plane's normal vector. Plane movement changes the position of all corresponding projected vertices. After adjustment has taken place, the steps performed in blocks 82–90 are repeated until an acceptable three-dimensional model is found. Three-dimensional object generation is illustrated by example in FIG. 12 and described below.

Figure 5:
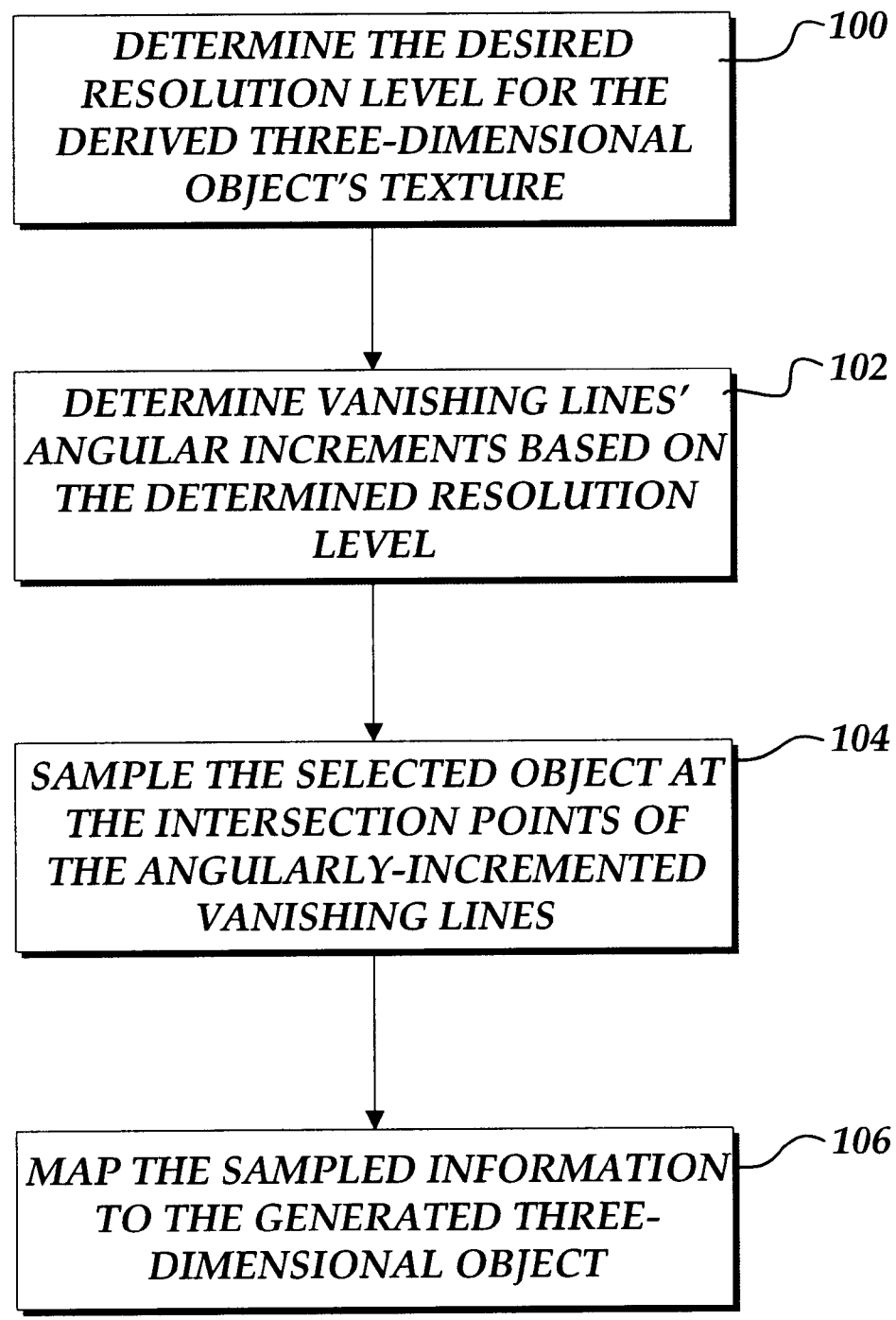
Figure 13:
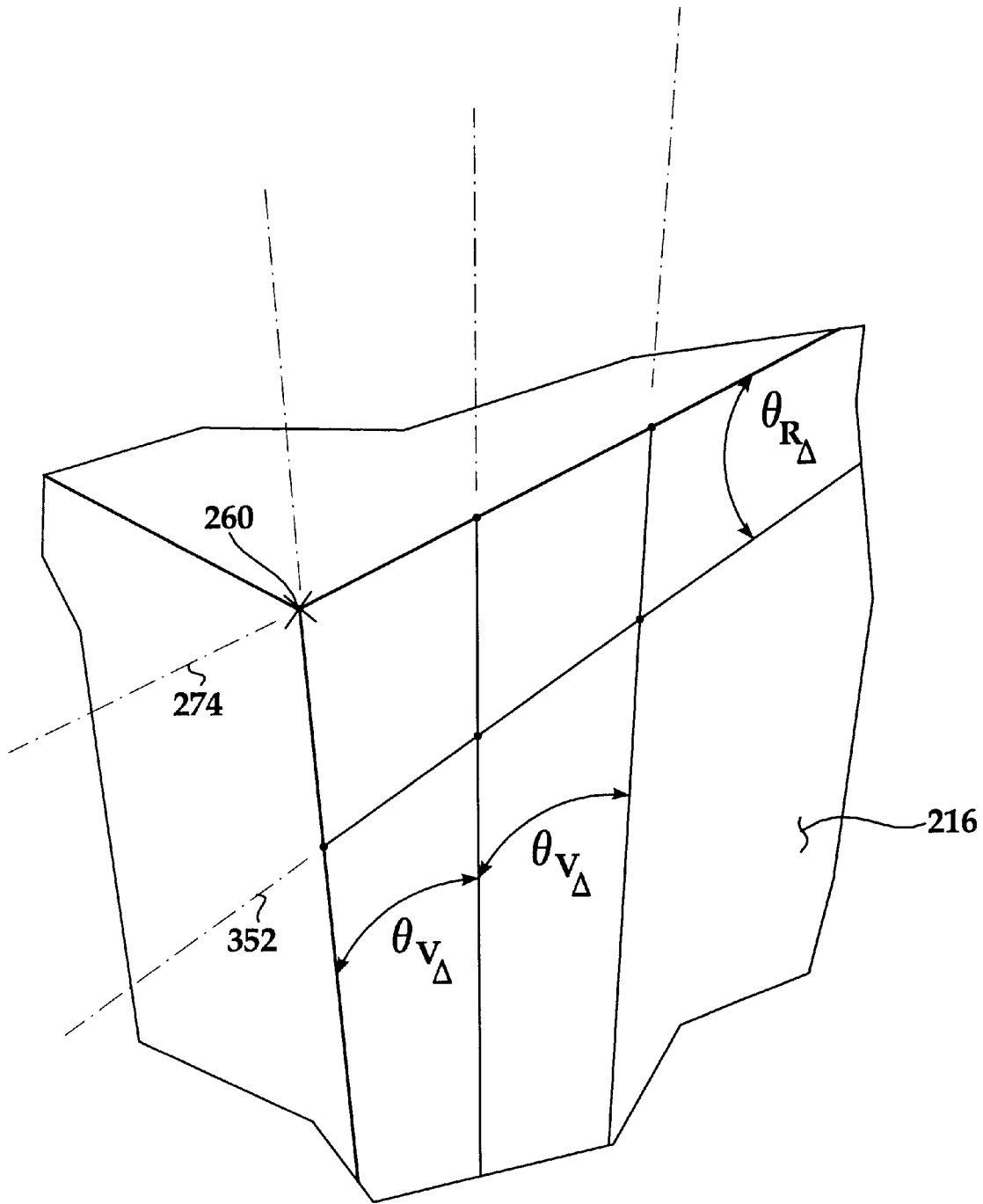
FIG. 13 is a zoomed illustration of the scanning process of the designated shapes performed using the graphical interface tools of FIGS. 9 or 10.

FIG. 5 illustrates the display information extraction process performed by block 56 of FIG. 2. First, at block 100, the desired resolution level of the three-dimensional object's texture is determined. This is simply determining how much detail is required for mapping of information onto the surface of the determined three-dimensional object. Then, at block 102, the angular increments for the sampling vanishing lines are determined based on the determined desired resolution level. Angular increments are small for high resolution levels and large for low resolution levels. Next, at block 104, each displayed polygon of the selected object is sampled for display or texture information at each intersecting point of the angularly incremented vanishing lines. Finally, at block 106, the sampled information is mapped to its proper location on the defined three-dimensional object based on the sampled information's location within the corresponding determined shape. This scanning process simply compensates for the perspective viewing of the displayed object in the two-dimensional image. Incrementing and sampling are illustrated in FIG. 13 and described in more detail below.

Figure 6A:
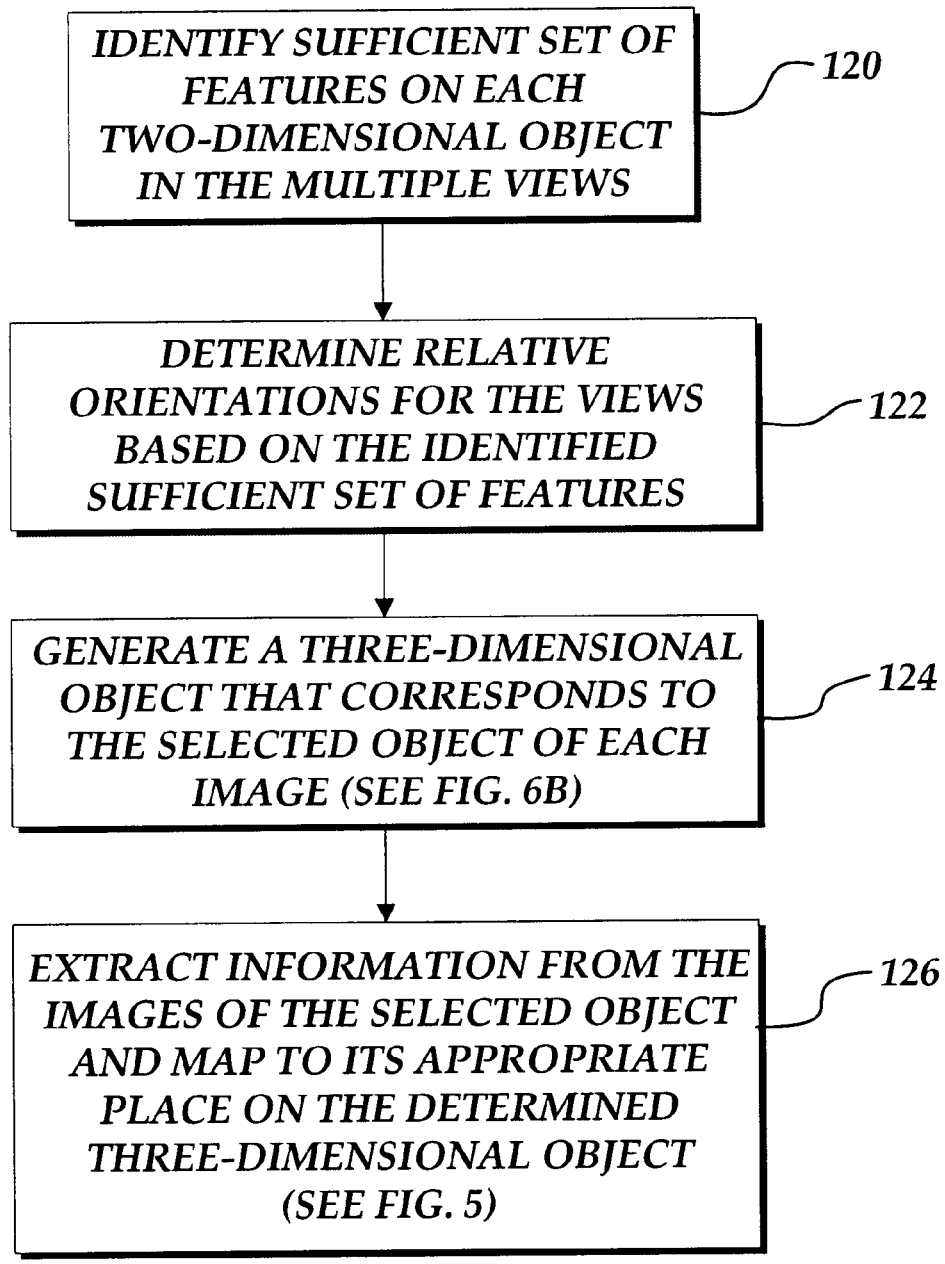
FIGS. 6A and 6B are flow diagrams illustrating the steps for converting multiple three-dimensional digital computer objects created from two-dimensional images of a single object into a single three-dimensional digital computer object.
Figure 9:
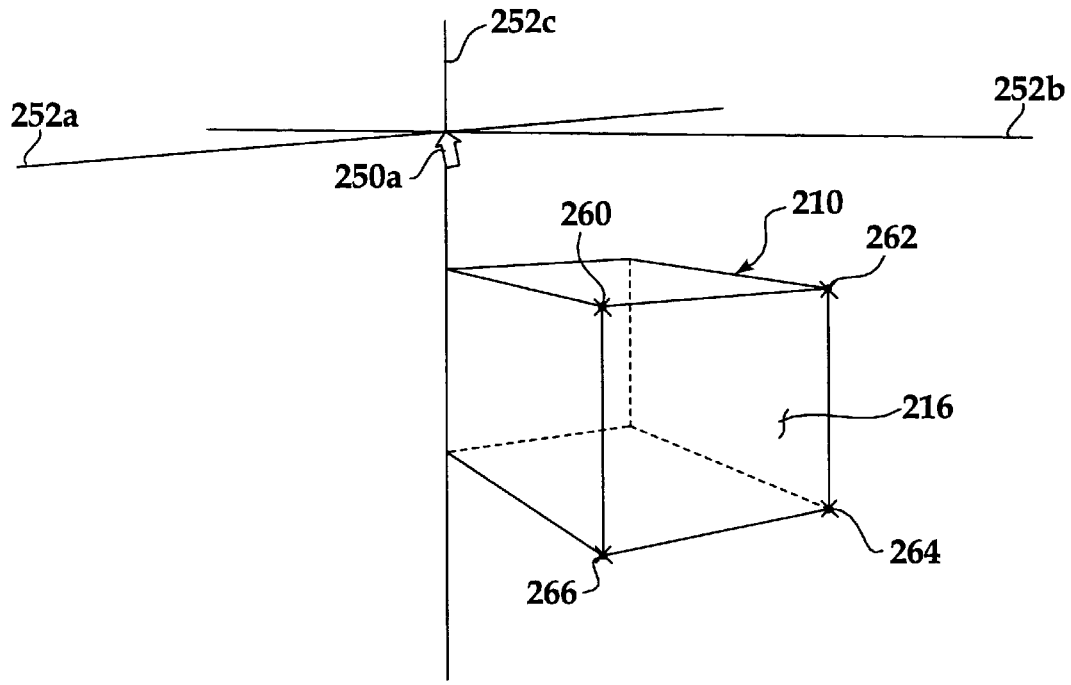
FIGS. 9 and 10 are illustrations of graphical interface tools for designating shapes on an object in a two-dimensional image based on the perspective vanishing points as shown in FIG. 8.
Figure 10:
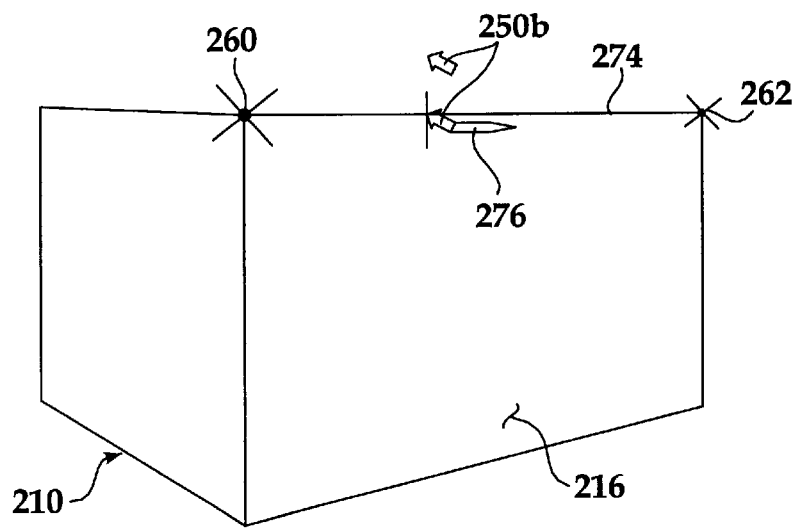

FIG. 6A illustrates the process by which the image converting system 20 shown in FIG. 1 generates a single three-dimensional object from two or more three-dimensional objects created from two-dimensional images of a single object, as shown in FIGS. 24 above. At block 120, a sufficient set of features or significant features are identified on each two-dimensional object in the multiple views. A sufficient set of features may include any set of matching or conjugate vertices, vanishing lines or planes between the multiple images. The set is sufficient when the conjugate matches between the images provides enough information for determining relative orientation information between each view. Relative orientation for each view is determined at block 122. The relative orientation of a view is how the vertices, vanishing lines or planes it sees correspond to those of the other views. For example, if two views of the same object differ by 180°, the left vanishing lines and planes in one view are the right vanishing lines and planes in other view. Preferably, the user designates conjugate components using the interface devices, examples of which are shown in FIGS. 9 and 10.

At block 124, the single three-dimensional object is created in world coordinate space based on the three-dimensional coordinate spaces (SWCS) for each image, and the objects in each two-dimensional image and the determined relative orientations. The origin of the world coordinate space is set at a default position and the orientation is set to a default orientation. If components of the created three-dimensional object are inverted or out of place because of ambiguous or improper relative orientation determination, the user can manually correct the created object by using the user interface. The three-dimensional object generation is performed according to the process illustrated in FIG. 6B and described in more detail below. Finally, the displayed digital images are scanned for display information which is then mapped onto the determined three-dimensional object. See block 126.

Figure 6B:
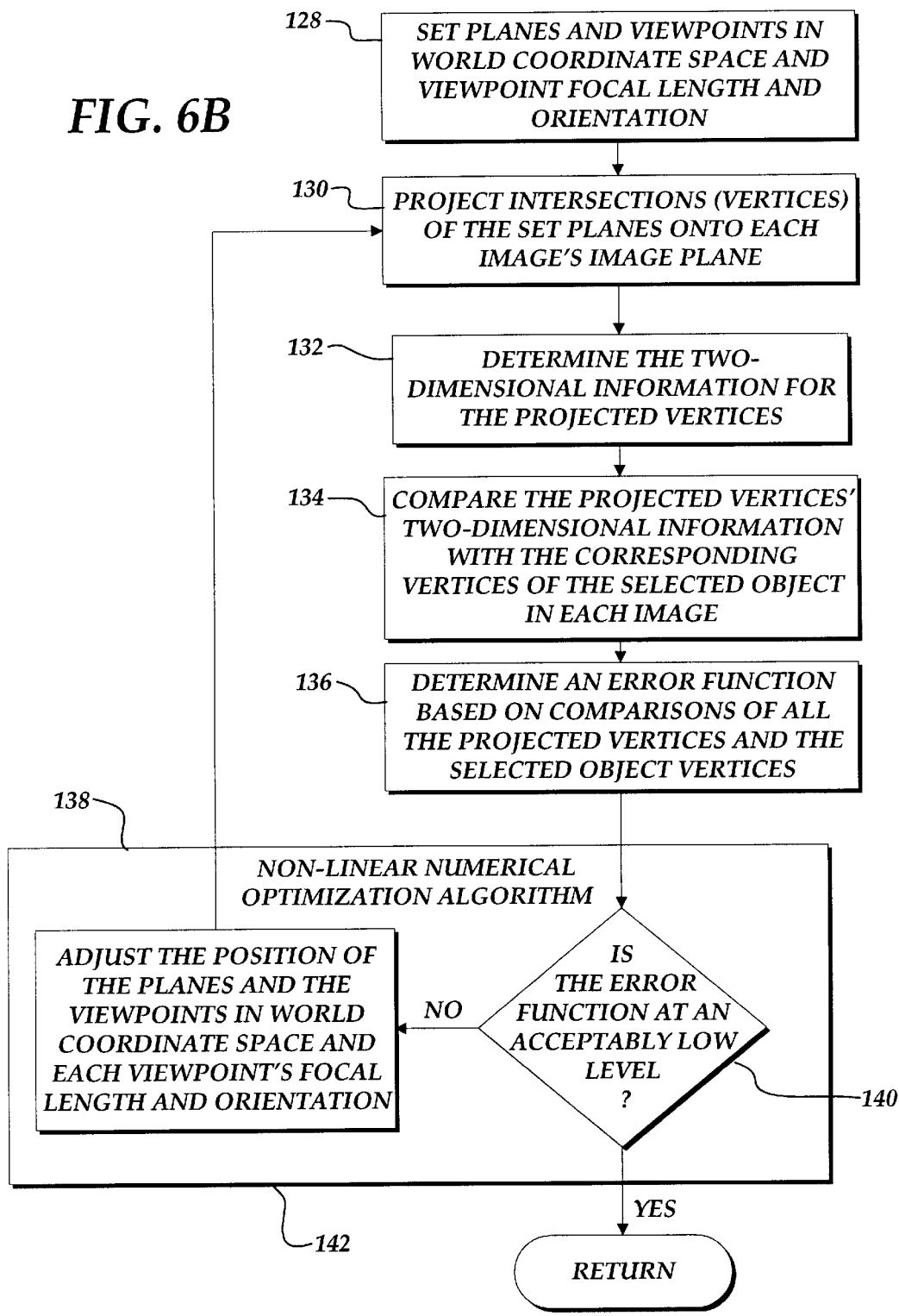

FIG. 6B illustrates the three-dimensional object generation process from block 124 of FIG. 6A. First, at block 128, planes referenced to the world coordinate space are set at a default position, each image's viewpoint is set at a default position in world coordinate space and each image's viewpoint is set to a default focal length and orientation. Next, at block 130, the intersection points of the set planes which correspond to vertices in the created three-dimensional object are projected onto each image's image plane using each image's set viewpoint focal length. At block 132, the projected vertices' two-dimensional values on the image planes are determined. Then, at block 134, the image plane location of each designated vertex of the selected object is compared to its corresponding determined projected vertex. An error function is determined based on the comparisons. See block 136. Next, at block 138, an iterative non-linear numerical optimization algorithm is executed according to the determined error function. More specifically, at decision block 140, the non-linear optimization algorithm determines if the determined error function is at an acceptably low level. An acceptable error function level exists when the difference between the projected vertices and the selected object's vertices is below a minimal value. If the determined error function is at an acceptably low level, the process continues as shown in FIG. 6A. However, if the non-linear optimization algorithm determines that the determined error function is not at an acceptably low level, the planes' positions and each image's position in world coordinate space, and each image's viewpoint focal length and orientation are adjusted based on the determined error function. See block 142. The planes are adjusted by moving each plane along the world coordinate space axis that is parallel to the plane's normal vector. The viewpoints' positions are adjusted by moving each viewpoint within the world coordinate system. The viewpoints' orientations are adjusted by orienting each viewpoint with respect to the world coordinate system. Focal length of each images' viewpoint is adjusted along the normal from the center of its respective image. These adjustments change the position of all projected vertices, thereby changing the ensuing comparison. After adjustment has taken place, the steps performed in blocks 130–136 are repeated until an acceptable three-dimensional model is found. Three-dimensional object generation is illustrated by an example shown in FIG. 12 and described below.

The present invention is an image converting computer system with a graphical user interface that allows a user to easily create three-dimensional solid objects or three-dimensional surfaces from at least one two-dimensional digital image. FIG. 7 illustrates an example of a digitized two-dimensional image 200 displayed within a windows-based user interface 202. This example is for illustrative purposes only. The interface 200 includes typical window interfaces such as an operating or display area 204 and a pull-down menu bar 206. In this example, the digitized two-dimensional image 200 is a perspectively drawn image. Alternatively the image could be a digitized image of a photo taken by a nondigital camera, a digital image taken by a digital camera, or a digital image created in some other manner, such as a scan of a hand-drawn perspective illustration.

The user first determines which object in the displayed two-dimensional image 200 the user wishes to transform into a three-dimensional object. In this example, the user has chosen object 210, which represents a rectangular building. The user then visually analyzes object 210, determines object 210's perspective orientation within image 200, determines if any other displayed objects have the same orientation and estimates the location of object 210's perspective vanishing points. Object 210 has three visible sides:

top 212; left 214; and right 216. Each side appears to converge in two directions or vanishing points.

Next, the user overlays at least two lines onto an object's side. As shown in FIG. 7, the user has created line 220 that overlays object 210's top edge. In this example, the user activated the mouse at position 224, then dragged the mouse to position 225, whereby the mouse is deactivated. Thus, line 220 that overlaps the edge of object 210 is created. As will be readily appreciated by those of ordinary skill in the art of computer graphics this line designation technique is similar to line designation techniques employed by previously developed graphics systems. Because the line was created by left to right cursor movement, the system concludes that line 220 has a right vanishing point. Other lines in image 200 that are parallel to line 220 can be designated for overlapping e.g., the bottom edges of sides 216 and 226, of objects 210 and 230, respectively, or the horizontal edges of windows (not shown) on those sides. After two or more overlapping lines are designated in the same direction, the system determines the corresponding vanishing point. If two lines were designated, a line intersecting algorithm determines the intersection of the overlapping lines on the image plane. If more than two lines were designated, a clustering algorithm determines the optimum location of the vanishing point. The other vanishing points are similarly determined. FIG. 8 illustrates the vanishing points of object 210. FIG. 8 has been intentionally distorted in order to show the vanishing points. In FIG. 7, the actual vanishing points are located outside the display area on the image plane. Once the vanishing points have been determined, the system determines the orientation of the images' three-dimensional coordinate space (SWCS) and the focal length of the image's viewpoint. This process is illustrated in FIG. 3, described above.

Once the three-dimensional coordinate space calculation is complete, the user begins converting object 210 into a three-dimensional object. First, corners and other significant features (vertices) on the object in the two-dimensional image are identified. FIGS. 9 and 10 illustrate different graphical interface tools for initiating shape and plane determination for a displayed object. As shown in FIGS. 9 and 10 and discussed below, a user designates vertices by activating a cursor and placing the cursor over the corners of the displayed object.

The cursor 250a, shown in FIG. 9 is an arrow. Located at the point or tip of the arrow are perspective cross hairs. The cross hairs are formed by intersecting lines 252a, b and c. When fully extended the cross hair lines intersect the vanishing points. The perspective cross hair lines allow a user to easily place the tip of the cursor arrow at the corners of the object 210. For example, when the tip of the cursor arrow 250a is located at a first corner 260, one of the cross hair lines 252a overlays the object's top edge whose vanishing point is the left vanishing point, another of the cross hair lines 252b overlays another of the object's top edges (in this case the edge whose vanishing point is the right vanishing point) and the remaining cross hair line 252c overlays the object's nearest vertical edge, whose vanishing point is the vertical vanishing point. This cursor allows identification of all of the corners of the object 210, even corners, like a bottom rear corner, that are not visible to the user.

Each shape on object 210 is determined after the user places the tip of the cursor arrow 250a on each corner that identifies a side and activates a button on the related mouse. In FIG. 9, side 216 is determined by sequentially placing the tip of the cursor arrow 250a on the corners and then activating the mouse, moving in a counter-clockwise direction. Left, right and vertical vanishing line information is generated for each vertex. A shape is defined by the vanishing line information for all the shape's vertices. As shown in FIG. 11, preferably, each vanishing line's information is the line's clockwise angular value $\theta_{VL}$ from a default 0° radial position from the vanishing point.

FIG. 10 illustrates another graphical tool that allows a user to efficiently designate vertices at corners of the displayed object. For illustrative purposes only, two sides of object 210 are shown. When a cursor arrow 250b is dragged to a point where the tip of the arrow is co-located with a vanishing line 274 of a previously designated vertex 260, a tail 276 attaches to the cursor arrow 250b. The tail 276 points to the vanishing line 274's vanishing point. With the tail 276 still displayed, the user simply drags the cursor arrow 250b to the nondesignated corner of the object 210 and activates cursor 250b, thereby designating vertex 262. More than one tail appears on cursor arrow 250b, when cursor arrow 250b is co-located with vanishing lines pointing to more than one vanishing point. As can be readily appreciated by those of ordinary skill in the art of CAD design, the system can also identify vertices that lie on vanishing lines of other vertices in a number of other graphical ways, such as changing the color or size of a line when the vertex shares the same vanishing line with a previously designated vertex or snapping the cursor to the vanishing line of a previously designated vertex when the cursor is at a predefined distance from that vanishing line.

When a vertex is designated, three orthogonal planes are also assigned to the vertex. If the three-dimensional object is being generated from a single two-dimensional image, the three orthogonal planes are oriented to the three-dimensional coordinate space (SWCS). The three orthogonal planes are not distinct numerical values but are arbitrary indexes for identifying each plane. The arbitrary indexes are place holders for actual plane values that are determined as illustrated in FIG. 12 and described below. The arbitrary indexes distinguish when one plane is shared by multiple vertices and each plane's location relative to the vanishing points. Referring to FIG. 9, the planes for vertices 260, 262, 264, and 266 may be identified as follows:

|  | Planes | | |
| --- | --- | --- | --- |
| Vertices | Left | Vertical | Right |
| 260 | 1 | 1 | 1 |
| 262 | 1 | 1 | 0 |
| 264 | 1 | 0 | 0 |
| 266 | 1 | 0 | 1 |

Each plane is identified by the direction of the plane's normal vector. The plane that represents side 216 is a left plane because its normal vector is directed at the left vanishing point. A "0" plane is a plane closer to its vanishing point than a "1" plane.

FIG. 12 illustrates the process performed in FIG. 4. Plane 300 is the two-dimensional image, which includes the selected object 210. Each plane in the set of planes 310 corresponds to a side of object 210. Each plane is initially given a default value in the three-dimensional coordinate space (SWCS). As shown in FIG. 12, planes 312 and 314 are defined with their normal vector being parallel to the left axis of the three-dimensional coordinate space. Therefore, planes 312 and 314 have values along to the left axis, such as plane 312=20 and plane 314=45. Once the set of planes 310 have been assigned values, their intersections which correspond to vertices in object 210 are projected to image plane 300 along a line of sight to the viewpoint 302 (with the distance between image plane 300 and viewpoint 302 equal to the image's previously determined focal length). For example, intersection 320 projects to image plane 300 at point 322. After all the intersections corresponding to vertices have been projected to the image plane 300, the image plane positions of object 210's vertices and the corresponding projected intersections are compared. One comparison is vertex 326 to point 322. The system then generates an error function based on all the comparisons. The positions of the planes are adjusted, if the error function is not at an acceptably low level. Plane 312 may be given a lesser value on the left axis, thereby moving its projected point closer to vertex 326. The process of comparing the projected intersections to the vertices of object 210 continues until the plane's positions provide an acceptable three-dimensional object.

FIG. 13 illustrates the image sampling process illustrated in FIG. 5 and described above. The system determines image sampling increments based on a default or user defined level of detail desired for the texture displayed on the generated three-dimensional object. FIG. 13 is a zoomed view of the sampling performed on side 216 of object 210. In this example, the scanning begins at vertex 260 and progresses along the right vanishing line 274 that defines the top edge of side 216. The sampling interval angle $^{74}V_A$ along the right vanishing line 274 changes as the angle $^\theta V$ changes to account for perspective. Once vanishing line 274 has been sampled from vertex 260 to vertex 262 (not shown), the sampling continues onto a next right vanishing line 352 at a change in angle $^{74}R_A$ dependent on $^{74}R$. The changes in angular values $^{74}R_A$ and $^{74}V_A$ at each $^{74}R$ and $^{74}V$, respectively, are determined based on the predetermined level of detail for the texture of the three-dimensional object. For example, if the three-dimensional object is to be created with a high level of detail angular values $^{74}R_A$ and $^{74}V_A$ will be small. The sampled information is then mapped to the three-dimensional object's surface according to its position within the predefined shape.

As will be readily appreciated by those of ordinary skill in the art of graphics processing and manipulation, various graphical tools and computer system components may be used to perform many of the user interactions described above. While FIGS. 7–13 show an implementation of the invention using only a single input image, the system can also use two or more input images. In this case the steps illustrated in FIGS. 6A and 6B and described above are applied to all images. As will be appreciated by those of ordinary skill in the art of graphics, because the present invention takes into account a user's ability to interpret many aspects of perspective images and three-dimensional objects, the present invention produces accurate three-dimensional objects more efficiently than conventional systems that try to solve this problem using analytical mathematical interpretations and orthogonal image analysis.

While the presently preferred embodiment of the invention has been illustrated and described, it is to be understood that within the scope of the appended claims various changes can be made therein without departing from the spirit and scope of the invention.

The embodiments of the invention in which an exclusive property or privilege is claimed are defined as follows:

1. An image converting system for converting objects in two-dimensional images of objects into three-dimensional objects, said system comprising:
    a processor;
    a memory;
    a display device for displaying a digitized two-dimensional image of one or more object;
    an input device; and
    a computer program stored in the memory and executed by the processor comprises:
        a vanishing point component for determining perspective vanishing points for a selected object;
        a three-dimensional coordinate space component for generating a three-dimensional coordinate space based on the determined perspective vanishing points;
        a graphical interface component for generating a graphical interface displayed on the display device and operable with the input device for allowing designation of vertices or vanishing lines at significant features of the selected object;
        a planes component for generating plane indexes for each designated vertex or vanishing line based on the determined perspective vanishing points; and
        a three-dimensional object component for generating a three-dimensional object in the generated three-dimensional coordinate space based on the designated vertices and the generated plane indexes of the selected object, wherein the display device displays the generated three-dimensional object.

2. The system of claim 1, wherein the three-dimensional coordinate space component of the computer program further comprises:
    a default setting component for setting a three-dimensional coordinate space at a default orientation relative to the image plane and setting a viewpoint for the image at a default focal length, wherein the origin of the set three-dimensional coordinate space is at the center of the image and wherein the set three-dimensional coordinate space includes left, right and vertical axes that correspond to the left, right and vertical vanishing points, respectively;
    an axis point component for projecting axis endpoints of the set three-dimensional coordinate space to the image plane;
    a comparison component for comparing the image plane location of each calculated vanishing point to a corresponding projected axis endpoint;
    an error function component for determining an error function based on the comparisons and determining if the determined error function is at an acceptable level;
    an adjusting component for adjusting the orientation of the three-dimensional coordinate space and the focal length of the image's viewpoint based on the determined error function;
    a repeat component for repeating the functions performed by the above components if the error function is not at an acceptable level; and
    a saving component for saving the three-dimensional coordinate space in memory, if the error function is at an acceptable level.

3. The system of claim 1, wherein the three-dimensional object component of the computer program further comprises:
    a planes setting component for setting planes at a default position, wherein the set planes are referenced to the generated three-dimensional coordinate space;
    a planes intersection points component for determining the set planes' intersection points in the generated three-dimensional coordinate space according to corresponding designated vertices;

a projecting component for projecting the determined intersection points that correspond to vertices to the image plane along a line of sight to a viewpoint, wherein the viewpoint is displaced from the image plane by a focal length and centered above the midpoint of the image;

a comparing component for comparing the image plane location of each vertex to the corresponding projected intersection point;

an error function component for determining an error function based on all the comparisons;

an adjusting component for adjusting the planes' positions based on the determined error function;

a repeat component for repeating the functions performed by the above components, if the error function is not at an acceptable level; and a saving component for saving the three-dimensional object that is defined by the intersection of the planes, if the error function is at an acceptable level.

4. The system of claim 1, wherein the computer program further comprises:

a resolution determining component for determining the desired resolution level of the three-dimensional objects' texture;

an incrementing component for determining angular increments for vanishing lines based on the determined desired resolution level;

a sampling component for sampling image information along vanishing lines based on the determined angular increments; and a mapping component for mapping the sampled image information onto the generated three-dimensional object based on the image information location within the corresponding determined shape.

5. The system of claim 1, wherein the displayed graphical interface comprises a perspective cross hair cursor, wherein the perspective cross hair cursor comprises lines that intersect at a user controlled cursor and extend to each of the vanishing points.

6. The system of claim 1, wherein the displayed graphical interface further comprises arrows that appear attached to a user controlled cursor when the cursor is co-located with vanishing lines of any previously designated vertex.

7. An image converting method for converting objects in two-dimensional images into three-dimensional digital objects, said method comprising:

displaying a digitized two-dimensional image of one or more object;

determining perspective vanishing points for a selected object;

generating a three-dimensional coordinate space based on the determined vanishing points;

generating a graphical interface for allowing designation of vertices or vanishing lines at significant features of the selected object;

generating plane indexes for each designated vertex or vanishing line based on the determined perspective vanishing points; and generating a three-dimensional object in the generated three-dimensional coordinate space based on the designated vertices and the generated planes of the selected object.

8. The method of claim 7, wherein the generating of a three-dimensional coordinate space based on the determined vanishing points further comprises:

a) setting a three-dimensional coordinate space at a default orientation relative to the image plane and setting a viewpoint at a default focal length for the image, wherein the origin of the set three-dimensional coordinate space is at the center of the image and wherein the set three-dimensional coordinate space includes left, right and vertical axes that correspond to the left, right and vertical vanishing points, respectively;

b) projecting axis endpoints of the set three-dimensional coordinate space to the image plane;

c) comparing the image plane location of each calculated vanishing point to a corresponding projected axis endpoint;

d) determining an error function based on the comparisons;

e) determining if the determined error function is at an acceptable level;

f) adjusting the orientation of the three-dimensional coordinate space and the focal length of the image's viewpoint based on the determined error function and repeating b)–f), if the error function is not at an acceptable level; and g) saving the three-dimensional coordinate space, if the error function is at an acceptable level.

9. The method of claim 7, wherein the generating of a three-dimensional object in the generated three-dimensional coordinate space further comprises:

a) setting planes at a default position, wherein the set planes are referenced to the generated three-dimensional coordinate space;

b) determining the set planes' intersection points in the generated three-dimensional coordinate space according to corresponding designated vertices;

c) projecting the determined intersection points that correspond to the designated vertices to the image plane along a line of sight to a viewpoint, wherein the viewpoint is displaced from the image plane by a focal length and centered above the midpoint of the image;

d) comparing the image plane location of each placed vertex to the corresponding projected intersection point;

e) determining an error function based on all the comparisons;

f) adjusting the planes' positions based on the determined error function and repeating b)–f), if the error function is not at an acceptable level; and g) saving the three-dimensional object that is defined by the intersection of the planes, if the error function is at an acceptable level.

10. The method of claim 7, further comprising:

determining the desired resolution level of the texture for the three-dimensional object;

determining angular increments for vanishing lines based on the determined desired resolution level;

sampling image information along vanishing lines based on the determined angular increments; and mapping the sampled image information onto the generated three-dimensional object based on the image information location within the corresponding determined shape.

11. An image converting system for converting multiple three-dimensional digital objects of a single object into a single three-dimensional object, wherein each preconverted three-dimensional digital object has an associated viewpoint and two-dimensional image, said system comprising:

a processor;

a memory;

a display device for displaying the preconverted three-dimensional objects;

an input device; and a first computer program stored in the memory and executed by the processor comprises:

a retrieving component for retrieving precreated two or more three-dimensional digital objects displayed in separate images;

an identifying component for identifying a sufficient set of features between the precreated two or more three-dimensional objects displayed in separate images, a orientation component for determining relative orientations of two or more precreated objects within each respective image based on the identified sufficient set of features; and a merging component for merging the precreated two or more three-dimensional objects into a single three-dimensional object based on the determined relative orientations.

12. The system of claim 11, wherein the set of features includes any combination of conjugate sets of vertices, vanishing lines, or planes.

13. The system of claim 11, wherein said merging component further comprises:

generating a single three-dimensional object in world coordinate space; and manipulating the generated three-dimensional object in world coordinate space based on the determined relative orientations and manipulating the position, orientation, and focal length of each two-dimensional images' viewpoint in world coordinate space.

14. The system of claim 13, wherein manipulating the generated three-dimensional object in world coordinate space further comprises:

a) setting planes as a default position, wherein the set planes are referenced to the world coordinate space;

b) setting each image's viewpoint to a default focal length, orientation, and position in the world coordinate space;

c) determining the set planes' intersection points in the world coordinate space;

d) projecting the determined intersection points that correspond to vertices onto each image's image plane via a direct line to each image's viewpoint using each image's viewpoint position, orientation, and focal length, and determining the projected vertices' two-dimensional values on the respective image planes;

e) comparing at each image plane of the multiple two-dimensional images each vertex of the single objects to its corresponding determined projected vertex's determined two-dimensional value;

f) determining an error function based on all the comparisons;

g) adjusting the position of the planes of the generated three-dimensional object and the position of the viewpoint in world coordinate space and orientation and focal length of the viewpoint of each two-dimensional image based on the determined error function and repeating e)–g), if the error function is not at an acceptable level; and h) saving the merged three-dimensional object that is defined by the intersection of the planes, if the error function is at an acceptable level.

15. The system of claim 13, further comprising a mapping component for mapping image information from the two or more three-dimensional objects onto the merged three-dimensional object.

16. The system of claim 11, wherein the precreated two or more three-dimensional objects are precreated by system for converting objects in digitized two-dimensional images into three-dimensional objects, said system comprising:

a processor;

a memory;

a display device for displaying a digitized two-dimensional image of one or more object;

an input device; and a second computer program stored in the memory and executed by the processor comprises:

a vanishing point component for determining perspective vanishing points for a selected object;

a three-dimensional coordinate space component for generating a three-dimensional coordinate space based on the determined perspective vanishing points;

a graphical interface component for generating a graphical interface displayed on the display device and operable with the input device for allowing designation of vertices or vanishing lines at significant features of the selected object;

a planes component for generating plane indexes for each designated vertex or vanishing line based on the determined perspective vanishing points; and a three-dimensional object component for generating a three-dimensional object in the generated three-dimensional coordinate space based on the designated vertices and the generated planes of the selected object, wherein the display device displays the generated three-dimensional object.

17. The system for converting objects in digitized two-dimensional images into three-dimensional objects of claim 16, wherein the three-dimensional coordinate space component of the second computer program further comprises:

a default setting component for setting a three-dimensional coordinate space at a default orientation relative to the image plane and setting a viewpoint for the image at a default focal length, wherein the origin of the set three-dimensional coordinate space is at the center of the image and wherein the set three-dimensional coordinate space includes left, right and vertical axes that correspond to the left, right and vertical vanishing points, respectively;

an axis point component for projecting axis endpoints of the set three-dimensional coordinate space to the image plane;

a comparison component for comparing the image plane location of each calculated vanishing point to a corresponding projected axis endpoint;

an error function component for determining an error function based on the comparisons and determining if the determined error function is at an acceptable level;

an adjusting component for adjusting the orientation of the three-dimensional coordinate space and the focal length of the image's viewpoint based on the determined error function;

a repeat component for repeating the functions performed by the above components if the error function is not at an acceptable level; and a saving component for saving the three-dimensional coordinate space in memory, if the error function is at an acceptable level.

18. The system for converting objects in digitized two-dimensional images into three-dimensional objects of claim 16, wherein the three-dimensional object component of the second computer program further comprises:

a planes setting component for setting planes at a default position, wherein the set planes are referenced to the generated three-dimensional coordinate space;

a planes intersection points component for determining the set planes' intersection points in the generated three-dimensional coordinate space according to corresponding designated vertices;

a projecting component for projecting the determined intersection points that correspond to designated vertices to the image plane along a line of sight to a viewpoint, wherein the viewpoint is displaced from the image plane by a focal length and centered above the midpoint of the image;

a comparing component for comparing the image plane location of each vertex to the corresponding projected intersection point;

an error function component for determining an error function based on all the comparisons;

an adjusting component for adjusting the planes' positions based on the determined error function;

a repeat component for repeating the functions performed by the above components, if the error function is not at an acceptable level; and a saving component for saving the three-dimensional object that is defined by the intersection of the planes, if the error function is at an acceptable level.

19. The system for converting objects in digitized two-dimensional images into three-dimensional objects of claim 16, wherein the computer program further comprises:

a resolution determining component for determining the desired resolution level of the three-dimensional objects' texture;

an incrementing component for determining angular increments for vanishing lines based on the determined desired resolution level;

a sampling component for sampling image information along vanishing lines based on the determined angular increments; and a mapping component for mapping the sampled image information onto the generated three-dimensional object based on the image information location within the corresponding determined shape.

20. An image converting method for converting multiple three-dimensional digital objects of a single object into a single three-dimensional object, wherein each preconverted three-dimensional digital object has an associated viewpoint and two-dimensional image, said method comprising:

retrieving precreated two or more three-dimensional digital objects displayed in separate images;

identifying a sufficient set of features between the precreated two or more three-dimensional objects displayed in separate images, wherein the set of features is sufficient for determining relative orientations of two or more precreated objects;

determining relative orientations of two or more precreated objects within each respective image based on the identified sufficient set of features; and merging the precreated two or more three-dimensional objects into a single three-dimensional object based on the determined relative orientations.

21. The method of claim 20, wherein the set of features include any combination of conjugate sets of vertices, vanishing lines or planes.

22. The method of claim 20, wherein merging comprises:

generating a three-dimensional object in world coordinate space; and manipulating the generated three-dimensional object in world coordinate space based on the identified sufficient set of features and the display location of the objects displayed in the digitized two-dimensional images used to create the precreated two or more three-dimensional objects.

23. The method of claim 22, wherein manipulating the generated three-dimensional object in world coordinate space further comprises:

a) setting planes as a default position, wherein the set planes are referenced to the world coordinate space;

b) setting each image's viewpoint to a default focal length, orientation, and position in the world coordinate space;

c) determining the set planes' intersection points in the world coordinate space;

d) projecting the determined intersection points that correspond to vertices onto each image's image plane via a direct line to each image's viewpoint using each image's viewpoint position, orientation, and focal length, and determining the projected vertices' two-dimensional values on the respective image planes;

e) comparing at each image plane of the multiple two-dimensional images each vertex of the single objects to its corresponding determined projected vertex's determined two-dimensional value;

f) determining an error function based on all the comparisons;

g) adjusting the position of the planes of the generated three-dimensional object and the position of the viewpoint in world coordinate space, and the orientation and focal length of the viewpoint of each two-dimensional image based on the determined error function and repeating e)-g), if the error function is not at an acceptable level; and h) saving the merged three-dimensional object that is defined by the intersection of the planes, if the error function is at an acceptable level.

24. The method of claim 21, further comprising mapping image information from the two or more three-dimensional objects onto the merged three-dimensional object.

25. The method of claim 20, wherein the precreated two or more three-dimensional objects are precreated by a method for converting objects in digitized two-dimensional images into three-dimensional objects, said method for converting objects in digitized two-dimensional images into three-dimensional objects comprising:

displaying a digitized two-dimensional image of one or more object;

determining perspective vanishing points for a selected object;

generating a three-dimensional coordinate space based on the determined vanishing points;

generating a graphical interface for allowing designation of vertices or vanishing lines at significant features of the selected object;

generating plane indexes for each designated vertex or vanishing line based on the determined perspective vanishing points; and generating a three-dimensional object in the generated three-dimensional coordinate space based on the designated vertices and the generated planes of the selected object.

26. The method for converting objects in digitized two-dimensional images into three-dimensional objects of claim 25, wherein the generating of a three-dimensional coordinate space based on the determined vanishing points further comprises:

a) setting a three-dimensional coordinate space at a default orientation relative to the image plane and setting a viewpoint at a default focal length for the image, wherein the origin of the set three-dimensional coordinate space is at the center of the image and wherein the set three-dimensional coordinate space includes left, right and vertical axes that correspond to the left, right and vertical vanishing points, respectively;

b) projecting axis endpoints of the set three-dimensional coordinate space to the image plane;

c) comparing the image plane location of each calculated vanishing point to a corresponding projected axis endpoint;

d) determining an error function based on the comparisons;

e) determining if the determined error function is at an acceptable level;

f) adjusting the orientation of the three-dimensional coordinate space and focal length of the image's viewpoint based on the determined error function and repeating b)–f), if the error function is not at an acceptable level; and g) saving the three-dimensional coordinate space, if the error function is at an acceptable level.

27. The method for converting objects in digitized two-dimensional images into three-dimensional objects of claim 25, wherein the generating of a three-dimensional object in the generated three-dimensional coordinate space further comprises:

a) setting planes at a default position, wherein the set planes are referenced to the generated three-dimensional coordinate space;

b) determining the set planes' intersection points in the generated three-dimensional coordinate space according to corresponding designated vertices;

c) projecting the determined intersection points that correspond to vertices to the image plane along a line of sight to a viewpoint, wherein the viewpoint is displaced from the image plane by a focal length and centered above the midpoint of the image;

d) comparing the image plane location of each placed vertex to the corresponding projected intersection point;

e) determining an error function based on all the comparisons;

f) adjusting the planes' positions based on the determined error function and repeating b)–f), if the error function is not at an acceptable level; and g) saving the three-dimensional object that is defined by the intersection of the planes, if the error function is at an acceptable level.

28. The method for converting objects in digitized two-dimensional images into three-dimensional objects of claim 25, further comprising:

determining the desired resolution level of the texture for the three-dimensional object;

determining angular increments for vanishing lines based on the determined desired resolution level;

sampling image information along vanishing lines based on the determined angular increments; and mapping the sampled image information onto the generated three-dimensional object based on the image information location within the corresponding determined shape.

29. A computer-readable medium having computer-executable instructions for performing the steps recited in claim 7.

30. A computer-readable medium having computer-executable instructions for performing the steps recited in claim 8.

31. A computer-readable medium having computer-executable instructions for performing the steps recited in claim 9.

32. A computer-readable medium having computer-executable instructions for performing the steps recited in claim 10.

33. A computer-readable medium having computer-executable instructions for performing the steps recited in claim 20.

34. A computer-readable medium having computer-executable instructions for performing the steps recited in claim 22.

35. A computer-readable medium having computer-executable instructions for performing the steps recited in claim 23.

36. A computer-readable medium having computer-executable instructions for performing the steps recited in claim 24.

37. A computer-readable medium having computer-executable instructions for performing the steps recited in claim 25.

38. A computer-readable medium having computer-executable instructions for performing the steps recited in claim 26.

39. A computer-readable medium having computer-executable instructions for performing the steps recited in claim 27.

40. A computer-readable medium having computer-executable instructions for performing the steps recited in claim 28.

* * * * *